United States Patent Office.

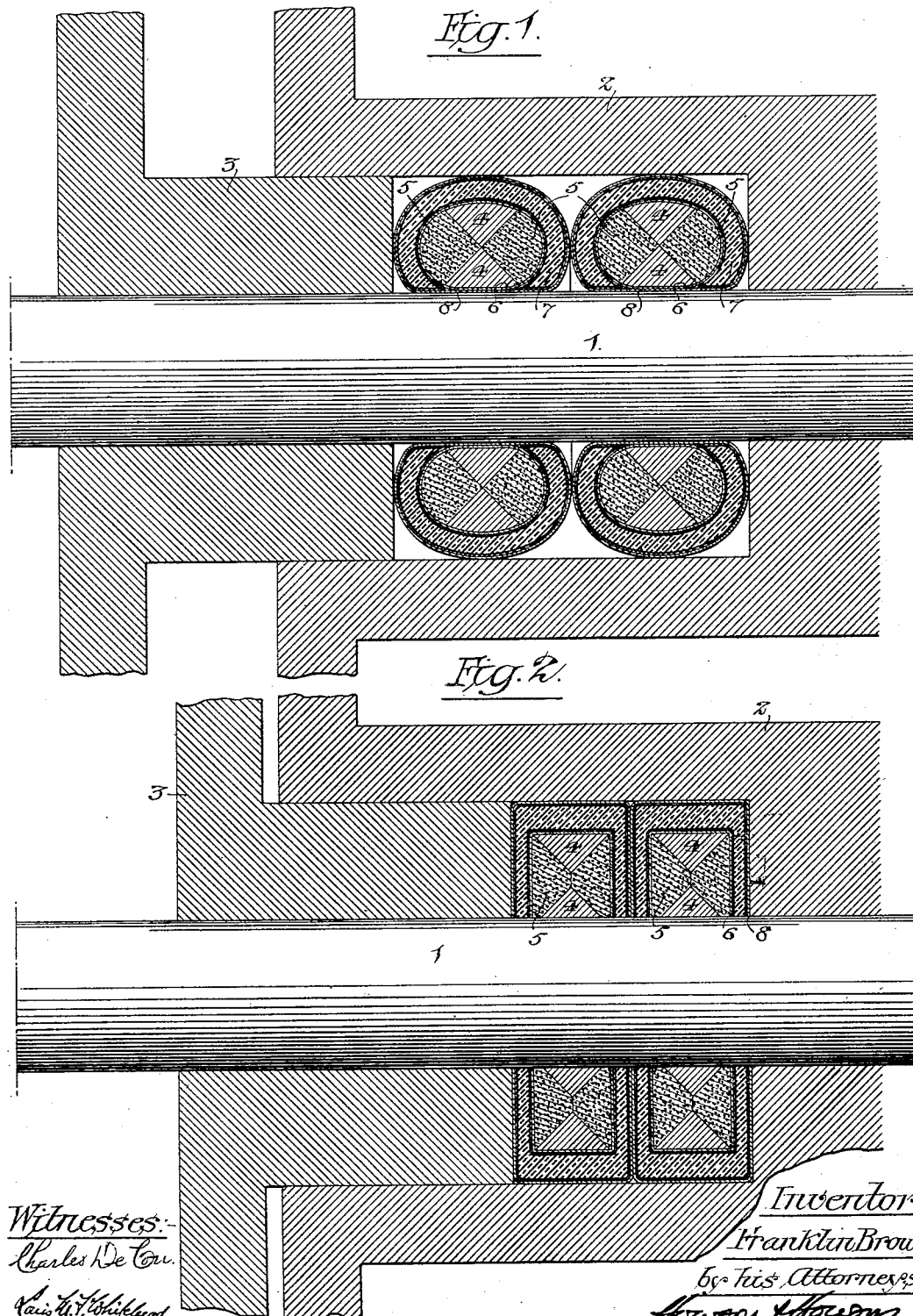

FRANKLIN BROWN, OF PHILADELPHIA, PENNSYLVANIA, ASSIGNOR TO THE JAMES SMITH & COMPANY, INCORPORATED, OF SAME PLACE AND CHARLESTON, WEST VIRGINIA.

ROD-PACKING.

SPECIFICATION forming part of Letters Patent No. 632,638, dated September 5, 1899.

Application filed March 27, 1899. Serial No. 710,680. (No model.)

*To all whom it may concern:*

Be it known that I, FRANKLIN BROWN, a citizen of the United States, residing in Philadelphia, Pennsylvania, have invented certain Improvements in Rod-Packing, of which the following is a specification.

The object of my invention is to so construct a packing for piston-rods, valve-rods, and the like that the same can be readily kept tight and the individuality of the successive rings of the packing will be preserved, so that the capacity of the same for adjustment independent of each other to compensate for wear will not be interfered with. This object I attain in the manner hereinafter set forth, reference being had to the accompanying drawings, in which—

Figure 1 is a sectional view of part of a piston or valve rod with the ordinary stuffing-box and its follower and with packing constructed in accordance with my invention, the packing being shown in the uncompressed form as it appears when first introduced into the stuffing-box; and Fig. 2 is a view similar to Fig. 1, but showing the packing compressed as it appears after it has been used for some time.

In the drawings, 1 represents part of a piston or valve rod, 2 part of the stuffing-box, and 3 the usual follower whereby the packing is compressed in said stuffing-box.

In the present instance I have shown packing consisting of two rings, each comprising an inner portion composed of rings of triangular cross-section 4 4 and 5 5, disposed point to point and contained within a braided or other fibrous wrapping or cover 6 and an outer arch-shaped casing or inclosure 7, which is preferably composed of alternate layers of rubber and textile fabric similar to ordinary fire-hose and is open on the side toward the rod, this casing being contained within a braided or other fibrous covering 8.

The rings 4 of the inner packing are preferably composed of comparatively unyielding textile material, while the rings 5 are of more compressible material and the whole is thoroughly saturated with lubricating material of any desired character.

When the arch-shaped casings of the packing are subjected to the pressure of the follower, they are flattened and compressed, as shown in Fig. 2, thereby imparting pressure to the rings 5 of the internal packing and causing the latter to force apart the rings 4, the inner rings being pressed firmly against the rod, so as to insure a tight joint, and the attainment of this result being aided by the pressure of the inner edges of the casings 7 upon the rod on each side of the ring 4.

The casings 7 serve to preserve the individuality of the inner masses of packing and insure the wedge-like or expansive action of the same until the packing is worn out, thus overcoming an objection to packing in which the wedge-like bodies alone are employed, as such packing under the pressure of the follower 3 is soon reduced to a common mass in which the identity of the wedges is lost.

I am aware that it has been proposed to confine a mass of lubricating material in a section of lead or other soft-metal pipe, forming an arch-like covering, and therefore I lay no claim to such invention, my invention being distinct from this in that the inner body of the packing is especially constructed to have a wedge-like or expansive action, and the outer body or casing is of material possessing elasticity, so that it will exert an elastic pressure upon the inner contained body of the packing and will itself be expanded so as to bear upon the rod, thereby materially lessening the pressure upon the follower necessary to properly pack the rod.

I am also aware that it has been proposed to make rod-packing rings of rubber grooved or recessed on the face next to the rod and having fibrous packing in such groove or recess, but this also lacks the wedge-expansion features of my packing, and the rubber is not as good a medium to impart pressure as my arch-like casing composed of rubber and textile material. Moreover, the rubber casing of said previous packing had no bearing upon the rod, as in my case.

Having thus described my invention, I claim and desire to secure by Letters Patent—

1. Rod-packing consisting of an inner body having rings of triangular cross-section disposed so as to be forced apart by pressure exerted in the direction of the length of the rod and an outer casing of elastic material containing said inner body but open on the side toward the rod, substantially as specified.

2. Rod-packing consisting of an inner body composed of rings of triangular cross-section disposed point to point, and an outer casing of elastic material containing the same but open on the side toward the rod, substantially as specified.

3. Rod-packing consisting of an inner body having rings of triangular cross-section disposed so as to be forced apart by pressure exerted in the direction of the length of the rod, and an outer casing of elastic material containing said inner body but open on the side toward the rod, and having a bearing on the rod, on each side of said inner packing, substantially as specified.

In testimony whereof I have signed my name to this specification in the presence of two subscribing witnesses.

FRANKLIN BROWN.

Witnesses:
F. E. BECHTOLD,
JOS. H. KLEIN.